United States Patent [19]

Davis

[11] 4,429,447
[45] Feb. 7, 1984

[54] BEARING CUP INSTALLING TOOL

[75] Inventor: Marvin A. Davis, Faribault, Minn.

[73] Assignee: Owatonna Tool Company, Owatonna, Minn.

[21] Appl. No.: 408,152

[22] Filed: Aug. 16, 1982

[51] Int. Cl.³ .............................................. B25B 27/14
[52] U.S. Cl. ......................................... 29/275; 29/262
[58] Field of Search ................. 29/275, 254, 261, 262, 29/265, 724

[56] References Cited

U.S. PATENT DOCUMENTS

| | | |
|---|---|---|
| 1,364,489 | 1/1921 | Edelblut . |
| 1,473,075 | 11/1923 | Bates . |
| 1,650,964 | 11/1927 | Schmitt ................................. 29/262 |
| 2,755,540 | 7/1956 | Crozier ................................. 29/265 |
| 3,057,052 | 10/1962 | Robertson . |
| 3,177,571 | 4/1965 | Carlson et al. ......................... 29/262 |
| 3,336,652 | 8/1967 | Ullmo . |
| 4,050,136 | 9/1977 | Shultz . |

FOREIGN PATENT DOCUMENTS 370794 4/1932 United Kingdom .................. 29/261

Primary Examiner—Robert C. Watson
Attorney, Agent, or Firm—Wood, Dalton, Phillips, Mason & Rowe

[57] ABSTRACT

A bearing cup installing tool adjustable for installation of bearings of various diameters. The tool has a cross head with a driving handle connected thereto and extending from one side thereof. An adjusting screw associated with the cross head extends outwardly therefrom from a side opposite the driving handle and three jaws are pivotally mounted on the cross head in equally-spaced relation and extending from the same side of the cross head as the adjusting screw and disposed in a circular array with the adjusting screw at the center. Each jaw has a bearing cup engaging notch at a free end thereof. The adjusting screw can be moved lengthwise of the cross head, by coacting structure on the adjusting screw and the jaws, to pivot the jaws to set an effective diameter as defined by the bearing cup engaging notches for engagement with a bearing cup.

6 Claims, 6 Drawing Figures

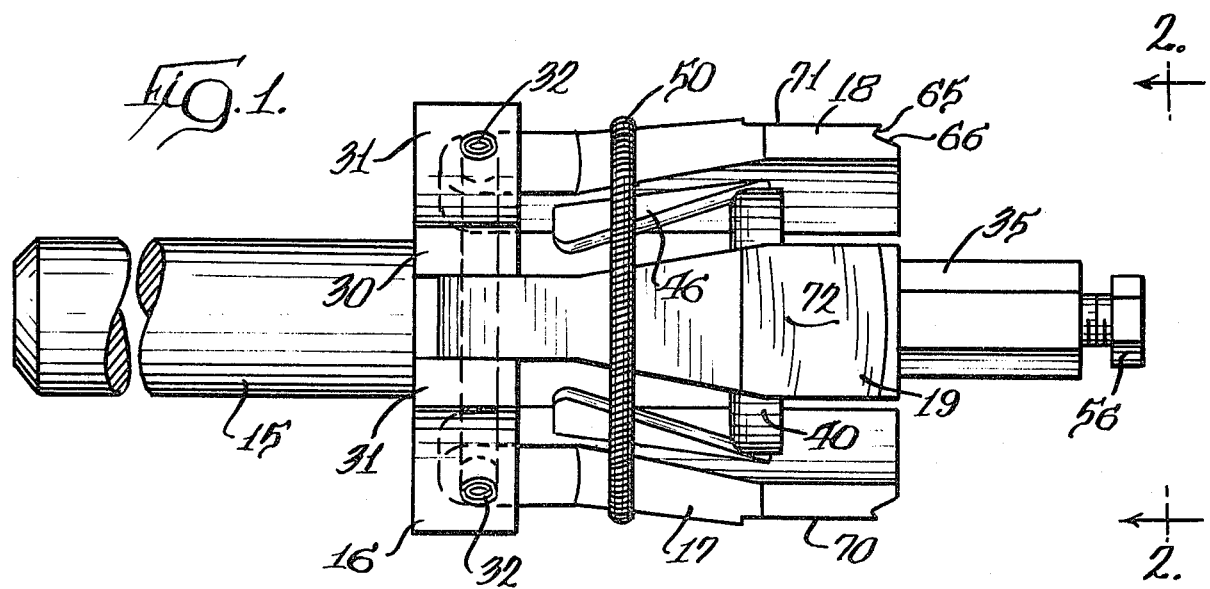
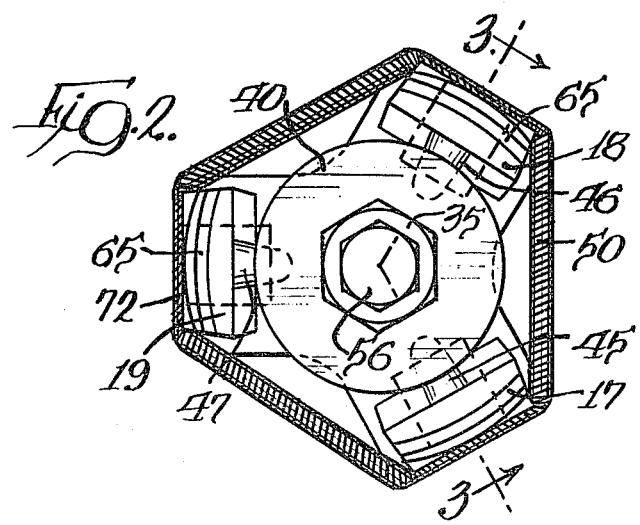
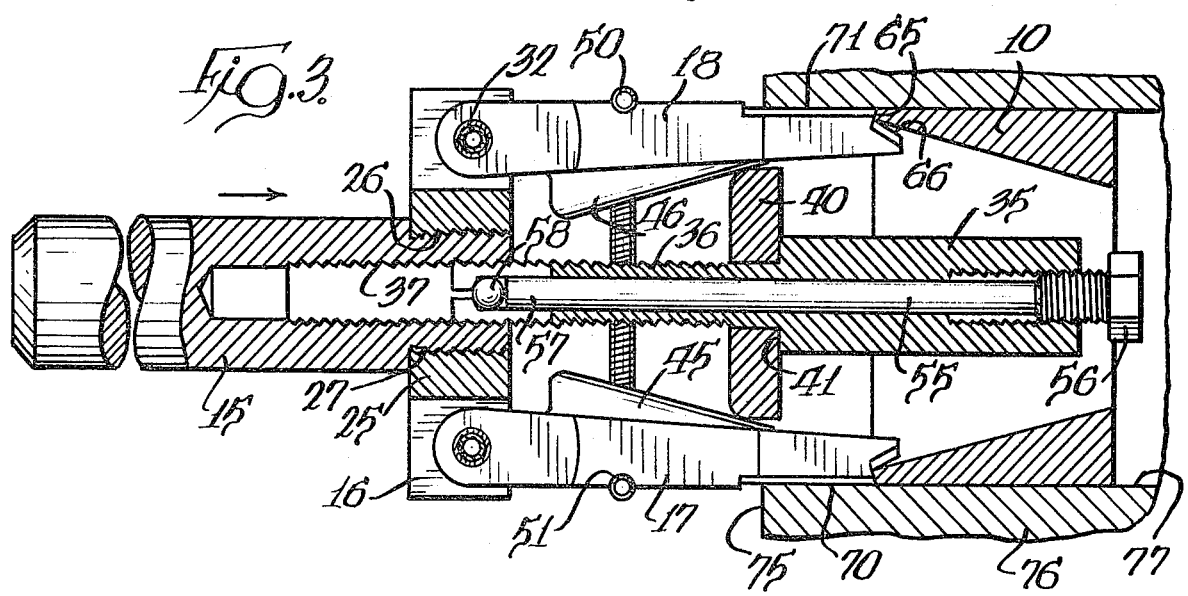

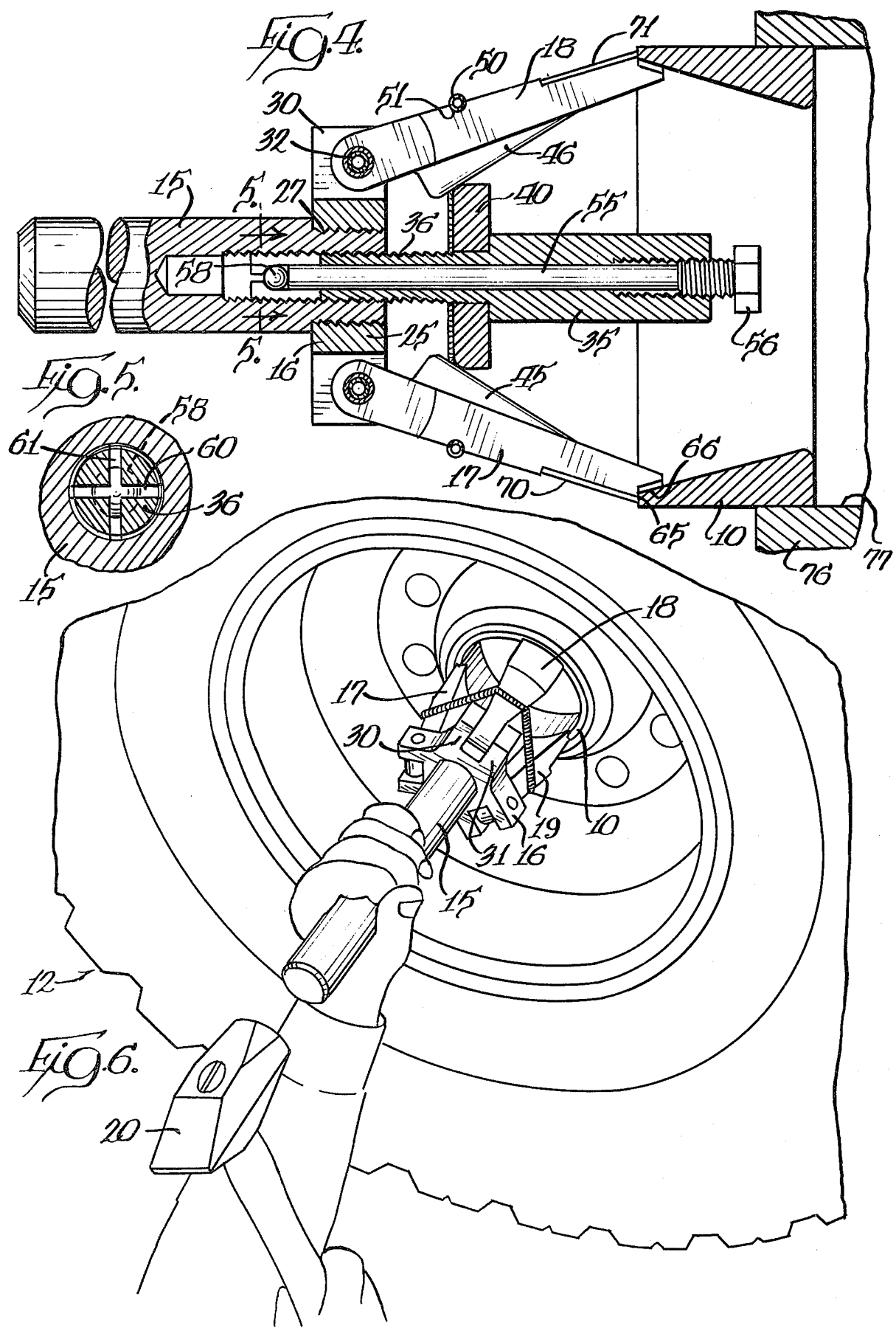

BEARING CUP INSTALLING TOOL

BACKGROUND OF THE INVENTION

This invention pertains to a universal bearing cup installer tool which is of a simple rugged construction and can be easily adjusted for association with bearing cups of varying diameters and without the use of interchangeable parts. Frequently, in servicing and maintenance of equipment, it is necessary to drive a tubular member into a bore in a housing. In order to install tubular members of various diameters, a driver set is available wherein one of a series of discs of different diameters, depending on the diameter of the tubular member, can be selected and assembled with a driver member, with the assembled structure aligned with the tubular member and the driver member being struck by a hammer or associated with a press to seat the tubular member in the bore. Use of such a set requires assembly and disassembly when a different size tubular member is to be installed in a bore and there is always the possibility of losing a driver disc of a particular diameter, so that the set can no longer be used for installing a tubular member of that particular diameter.

It is also known in the prior art to have a tool with a series of movable jaws arranged in a circular array that can have the effective diameter defined thereby varied in order to coact with tubular members of varying diameters. These tools do not have structure providing a long useful life and simple adjustment. Additionally, the prior art structures do not have structural features facilitating the installing of a tapered cone bearing cup.

SUMMARY OF THE INVENTION

A primary feature of the invention disclosed herein resides in a universal installing tool for a tubular member and particularly a tapered bearing cup having structure enabling a simple adjustment for use with tubular members of a range of diameters and structural strength to transmit the force received from hammer blows and still have a long, useful life.

Other features of the invention relate to a universal installing tool for tubular members, such as a bearing cup, having a relatively long driving handle to assist in obtaining perpendicularity of the tool and a bearing cup to a member having a bore which receives the bearing cup; the adjustment of a plurality of jaws having driving notches for engaging the bearing cup by structure which is completely independent of force-transmitting surfaces between the driving handle and a cross head mounting the jaws; the shaping of the bearing cup engaging notches at the end of the jaws to have driving surfaces abuttable against the end of the bearing cup and aligning surfaces at an angle to the driving surfaces closely approximating the taper of the bearing cup to engage within the bearing cup and assist in maintaining alignment of the tool with the bearing cup; and curved surfaces on the exterior of the jaws to the rear of the bearing cup engaging notches which enables entry of the jaws into a minimal diameter bore when the bearing cup is to be moved inwardly beyond the exterior opening of the bore which receives the bearing cup.

An object of the invention is to provide a tapered bearing cup installing tool comprising, a cross head, a driving handle connected to said cross head and extending from one side thereof, an adjusting screw threaded into the cross head and extending outwardly from the side thereof opposite said driving handle, a plurality of jaws pivotally mounted on said cross head and extending from the same side of the cross head as the adjusting screw and disposed in a circular array with the adjusting screw at the center, each of said jaws having a bearing cup engaging notch at a free end thereof, each of said notches having a driving surface for engagement with an end of a bearing cup and an aligning surface extending inwardly from the driving surface at an angle to closely approximate the taper of the bearing cup, and coacting means on the adjusting screw and the jaws whereby movement of the adjusting screw lengthwise of the cross head pivots the jaws and varies the effective diameter defined by the bearing cup engaging notches.

BRIEF DESCRIPTION OF THE DRAWINGS

FIG. 1 is a side elevation of the bearing cup installing tool adjusted for association with a bearing cup of one diameter and with parts broken away;

FIG. 2 is an end elevational view, taken generally in the direction of line 2—2 in FIG. 1;

FIG. 3 is a sectional view, taken generally along the line 3—3 of FIG. 2 and showing the tool in the process of installing a bearing cup;

FIG. 4 is a view, similar to FIG. 3, on an enlarged scale showing the tool adjusted for and in the process of installing a larger diameter bearing cup;

FIG. 5 is a sectional view, taken generally along the line 5—5 in FIG. 4; and

FIG. 6 is a perspective view, showing the installing tool in use.

DESCRIPTION OF THE PREFERRED EMBODIMENT

Referring to FIG. 6, the installing tool is shown in use. A tapered bearing cup 10 is being inserted into an opening in a vehicle wheel, indicated generally at 12. The tool has a driving handle 15 which is held manually and a cross head 16 having jaws 17, 18 and 19. The jaws engage an outer end of the bearing cup 10 whereby driving force imparted by a hammer 20, struck against an end of the driving handle, drives the bearing cup 10 into the opening. The driving handle 15 has a substantial length and approximately three times the length of the jaws 17-19 whereby visual orientation of the tool and the bearing cup to be perpendicular to the wheel and thus have the bearing cup properly aligned with the bore is facilitated.

As seen particularly in FIGS. 2, 3 and 6, the cross head 16 has a central section 25 provided with a threaded opening to which a threaded end of the driving handle 15 connects, as indicated at 26. The central section of the cross head and the drive handle have abutting force-transmitting surfaces, as indicated at 27. The cross head 16 has three pairs of radially-extending arms with one of the jaws associated with each pair of arms. Referring particularly to the jaw 18, an end thereof is positioned between the arms 30 and 31 and is pivotally mounted to the arms by a pair of interfitted roll pins 32 which fit into openings in the arms and loosely fit within an opening of the jaw. Mounting of the jaws 17 and 19 is accomplished in the same manner as that described in connection with the jaw 18.

An adjusting screw 35, with an outer end shaped for engagement by a wrench, had a reduced diameter length 36 which is externally threaded and threads into an internally threaded opening 37 in the driving handle 15. A disc 40 is fitted onto the reduced diameter section 36 and abuts a shoulder 41 on the adjusting screw. With this construction, the driving handle extends from one side of the cross head 16 and the adjusting screw 35 extends from the other side whereby adjustment of the jaws is accomplished completely independently of the connection of the driving handle to the cross head. Rotation of the adjusting screw results in either retraction or advance thereof relative to the cross head dependent upon the direction of rotation of the adjusting screw with corresponding movement of the disc 40. The disc 40 coacts with cams formed one on the inner surface of each of the jaws 17, 18 and 19 and, as identified at 45–47, respectively.

Each of the cams has an inclined surface for engagement with the disc and the cams are urged into engagement with the disc by an extension spring 50 which surrounds the jaws and is held in position by engaging in a groove formed in the exterior of each of the jaws and as indicated at 51 for the jaw 17.

The three jaws 17, 18 and 19 are arranged in a circular array about the adjusting screw 35 and with the adjusting screw being at the center of the circular array. As shown in FIGS. 1 and 3, the bearing cup installing tool is adjusted to set the jaws at approximately their minimum effective diameter as defined by notches to be described. In FIG. 4, the jaws are set at approximately their maximum effective diameter, as established by the disc 40 being advanced to a position closely adjacent the cross head and well advanced along the inclined surfaces of the cams 45–47.

The setting of the jaws, as determined by the location of the disc 40, is maintained by means operable internally of the adjusting screw for locking the adjusting screw in position. This structure includes an extender rod 55 movable within a bore extending lengthwise of the adjusting screw and positionable by a cap screw 56 threaded into an end of the bore in the adjusting screw. An end 57 of the extender rod engages a ball 58 seated at an inclined base of the bore in the adjusting screw. As seen particularly in FIG. 5, the end of the adjusting screw is formed with cross cut slots 60 and 61 to permit radial expansion thereof as induced by the ball 58 being forced against the inclined end of the bore of the adjusting screw. With this structure, the cap screw 56 can be rotated to move the extender rod 55 inwardly and exert force on the ball 58 which expands the inner end of the adjusting screw into tight fitting relation with the threads 37 in the bore of the driving handle 15, which maintains the adjusting screw in a desired position.

Each of the jaws 17, 18 and 19 has a bearing cup engaging notch at an end thereof which is formed by a pair of angularly related surfaces including a driving surface 65 and an aligning surface 66, as shown for the jaw 18. The driving surfaces 65 of the jaws engage against an outer end of the bearing cup and, in response to force applied to the driving handle 15 urge a bearing cup into the bore. The aligning surfaces 66 aid in aligning the tool with the bearing cup and, as seen in FIG. 4, when the tool is adjusted to its approximate maximum effective diameter, the aligning surfaces 66 are generally flush with the interior taper of the bearing cup for accurate alignment of the bearing cup with the tool. This is particularly important with a large diameter bearing cup which may have little depth in the direction of insertion into the bore and, thus, increases the accuracy of alignment and insertion of the bearing cup. The angle of the aligning surfaces relative to the driving surfaces is in the range of 13 to 17 degrees whereby, in the position shown in FIG. 4, the aligning surfaces closely match the taper of the bearing cup.

Referring particularly to the installation of a bearing cup of approximately minimal diameter, as shown in FIG. 3, the tool is adjusted to approximately its minimum effective diameter. In this position, the jaws 17–19 extend generally parallel to the adjusting screw 35 and the portions thereof immediately adjacent the bearing cup engaging notches are curved at 70, 71 and 72 to define a diameter equal to the bore receiving the bearing cup whereby the bearing cup may be inserted to a depth beyond merely being flush with the surface 75 of a member 76 having the bore 77 which receives the bearing cup.

In order to adjust the tool to the operative position shown in FIG. 4 from that shown in FIG. 3, the cap screw 56 is backed off to relax the force on the ball 59 whereby the adjusting screw is free to rotate in a direction to advance the disc 40 along the inclined surfaces of the cams 45–47. When the jaws are positioned at the desired effective diameter, the cap screw 56 is rotated to lock the adjusting screw in position. The tool and bearing cup are then properly aligned with respect to the bore receiving the bearing cup and a series of blows are struck against the driving handle 15 or force exerted by a press to advance the tool and the bearing cup inwardly of the bore.

With the foregoing description, it is evident that the installing tool for a tubular member, such as a bearing cup, can be adjusted easily for coaction with bearing cups of differing diameters and is of a rugged design to assure a long useful life, with improved structural features facilitating the alignment and insertion of a bearing cup in a bore.

I claim:

1. A tapered bearing cup installing tool comprising, a cross head, a driving handle connected to said cross head and extending from one side thereof, said handle and cross head having abutting force-transmitting surfaces, a tubular adjusting screw threaded into the cross head and extending outwardly from the side thereof opposite said driving handle, at least three jaws pivotally mounted on said cross head and extending from the same side of the cross head as the adjusting screw and disposed in a circular array with the adjusting screw at the center, spring means engaging said jaws and urging the jaws toward said adjusting screw, each of said jaws having a bearing cup engaging notch at a free end thereof, a disc on the adjusting screw and inclined surfaces on the inner faces of the jaws whereby movement of the adjusting screw lengthwise of the cross head pivots the jaws against the action of the spring means and varies the effective diameter defined by the bearing cup engaging notches, and means operable internally of the tubular adjusting screw for locking the adjusting screw in adjusted position.

2. A tool as defined in claim 1 wherein said bearing cup has an internal taper and said bearing cup engaging notches have sloped surfaces which match said taper when the jaws are disposed at approximately their maximum effective diameter.

3. A tool as defined in claim 1 wherein said driving handle has a length approximately three times that of the jaws to enable holding of the tool at a distance from a bearing cup engaged in the bearing cup engaging notches to assist in aligning the tool and bearing cup perpendicularly to a surface of a member having a bore to receive the bearing cup.

4. A tool as defined in claim 1 wherein the exterior surfaces of said jaws adjacent said bearing cup engaging notches are curved to enable said jaws to enter a bore receiving the bearing cup when the jaws are at approximately a minimal effective diameter and extend generally parallel to the adjusting screw.

5. A tool as defined in claim 1 wherein said bearing cup engaging notches each have a driving surface for engagement with an end of a bearing cup and aligning surface extending inwardly at an angle from the driving surface.

6. A tool as defined in claim 5 wherein said aligning surface extends inwardly from the driving surface at an angle of approximately 13°–17° whereby an inner tapered surfce of the bearing cup is engaged by the aligning surface when the jaws are positioned to define approximately their maximum effective diameter.

* * * * *